United States Patent [19]

Kadokura et al.

[11] Patent Number: 5,002,750

[45] Date of Patent: Mar. 26, 1991

[54] PROCESS FOR PRODUCING ALUMINA-BASED FIBER

[75] Inventors: Hidekimi Kadokura; Masaji Harakawa; Takesi Matumoto, all of Niihama, Japan

[73] Assignee: Sumitomo Chemical Company, Limited, Osaka, Japan

[21] Appl. No.: 409,052

[22] Filed: Sep. 19, 1989

Related U.S. Application Data

[63] Continuation-in-part of Ser. No. 158,393, Feb. 2, 1988, abandoned.

[30] Foreign Application Priority Data

Mar. 5, 1987 [JP] Japan ................................. 62-51765

[51] Int. Cl.$^5$ .............................................. C01F 7/02
[52] U.S. Cl. ................................... 423/625; 423/327
[58] Field of Search .................. 423/625, 327; 501/35, 501/68, 128, 153, 129; 65/2, 8; 264/2.1

[56] References Cited

U.S. PATENT DOCUMENTS

| | | | |
|---|---|---|---|
| 2,389,352 | 11/1945 | Fisher | 423/327 |
| 3,321,271 | 5/1967 | Johnson et al. | 423/327 |
| 3,582,271 | 7/1968 | Minagawa et al. | 423/625 |
| 3,684,443 | 8/1972 | Zirngibl et al. | 423/625 |
| 3,709,706 | 1/1973 | Sowman | 501/103 |
| 3,950,478 | 4/1976 | Kenworthy et al. | 423/625 |
| 3,992,498 | 11/1976 | Morton et al. | 264/63 |
| 4,101,615 | 7/1978 | Horikiri et al. | 501/128 |
| 4,152,149 | 5/1979 | Horikiri et al. | 148/437 |
| 4,159,205 | 6/1979 | Miyahara et al. | 423/625 |
| 4,277,269 | 7/1981 | Sweeting | 423/625 |

FOREIGN PATENT DOCUMENTS

| | | | |
|---|---|---|---|
| 0083839 | 7/1983 | European Pat. Off. | 501/128 |
| 0121241 | 10/1984 | European Pat. Off. | 501/128 |
| 2102810 | 8/1972 | Fed. Rep. of Germany | 501/128 |
| 2012209 | 3/1970 | France | 423/327 |
| 40-26213 | 11/1965 | Japan | 501/128 |
| 45-9896 | 4/1970 | Japan | 501/128 |
| 53-38773 | 10/1978 | Japan | 501/128 |
| 55-20239 | 2/1980 | Japan | 423/327 |
| 1144033 | 3/1969 | United Kingdom | 501/128 |
| 1264973 | 2/1972 | United Kingdom | 501/128 |

OTHER PUBLICATIONS

A. Storr, J. Am. Chem. Soc., 90 3173–3177 (1968).

Primary Examiner—Peter D. Rosenberg
Attorney, Agent, or Firm—Stevens, Davis, Miller & Mosher

[57] ABSTRACT

A process for producing an alumina-based fiber, which involves mixing an aluminum compound represented by the general formula $AlR_1R_2R_3$ (wherein $R_1 R_2$ and $R_3$ are each an organic group or a halogen) with water in a molar ratio of $([H_2O]/[AlR_1R_2R_3])$ of 1.10 to 1.40 to produce a polyaluminoxane, mixing the polyaluminoxane with at least one silicon-containing compound in an amount such that desired alumina-based fiber has, after calcining, a silica content of up to 70%, spinning the resulting mixture of polyaluminoxane and silicon-containing compound under an atmosphere controlled at a temperature of above 28° C. and a relative humidity of above 35% to obtain precursor fiber, and then calcinating the precursor fiber to obtain an alumina-based fiber.

1 Claim, No Drawings

PROCESS FOR PRODUCING ALUMINA-BASED FIBER

This application is a continuation-in-part of application Ser. No. 07/158,393, filed Feb. 2, 1988, now abandoned.

The present invention relates to an alumina-based fiber comprising silicon oxide and aluminum oxide, which has excellent mechanical properties and heat resistance.

As a result of technological progresses in recent years in aerospace industry and many other industries, it is strongly desired to develop new materials superior to conventional ones in, for example, high temperature resistance and mechanical properties.

For improving the properties of conventional materials, there has generally been used a method of mixing conventional materials with a reinforcing material such as carbon fibers, metal fibers (e.g. tungsten fiber, molybdenum fiber or steel fiber), composite fibers obtained by coating the surface of tungsten fiber with boron, silicon carbide or the like, polycrystalline fibers of alumina, zirconia, silicon carbide or the like, or whiskers of silicon carbide, silicon nitride or the like to obtain a reinforced composite material.

As a reinforcing material for reinforced composite materials, metal oxide fibers have such characteristics that they can be used at high temperatures and in oxidizing atmospheres where carbon fibers or metal fibers are not usable, and they retain excellent mechanical properties even at high temperatures because of their generally possessed high melting points. Accordingly, the metal oxide fibers are promising not only as a reinforcing material but also for very wide applications of various industries.

Many processes have been proposed for production of a metal oxide fiber in, for example, Japanese Patent Publication Nos. 26213/1965, 9896/1970, 24690/1969, 30327/1973 and 18965/1976 and Japanese Patent Application Kokai (Laid-Open) No. 718/1972.

The present inventors had previously proposed a process for producing an alumina-based fiber using a polymetaloxane as the starting material, in Japanese Patent Publication Nos. 12736/1976, 13768/1976 and 38773/1978 and Japanese Patent Application Kokai (Laid-Open) No. 98428/1983.

The above process has many advantages over previously-mentioned other processes. For instance in the process, the precursor fiber has a high metal oxide content, and accordingly the fiber obtained after calcination is denser and has higher strength and higher elasticity; further, the spinning solution has good spinnability as compared with that from other processes enabling production of the continuous fiber.

During the research for improvement of said process in its industrial application, the present inventors found that the fiber produced on an industrial scale according to the process had a dispersion in the strength which had not been seen in the fiber produced on a laboratory scale according to the same process, and that the dispersion was investigated to be caused by fibers of lower strength having linear side flaws which were believed to have been produced by interfilament sticking during calcination, and moreover that the fiber breakage originated from the said flaws.

Under the above situation, the present inventors made extensive study in order to gain fibers having smaller dispersion in the strength even when produced on an industrial scale. As the result, it was found that precursor fibers obtained by mixing an aluminum compound and water in a particular mole ratio and spinning the resulting aluminoxane under an atmosphere controlled at a temperature of about 28° C. and relative humidity of above 35% had little adhesion between precursor fibers, and alumina-based fibers obtained by calcination of the precursor fibers had high strength and high elasticity and were free from dispersions in those properties. The finding has led to the completion of the present invention.

The present invention provides a process for producing an alumina-based fiber, which comprises mixing an aluminum compound represented by the general formula $AlR_1R_2R_3$ (wherein $R_1$, $R_2$ and $R_3$ are each an organic group or a halogen atom) with water in a mole ratio ($[H_2O]/[AlR_1R_2R_3]$) of 1.10 to 1.40 to produce a polyaluminoxane having a structural unit represented by the general formula

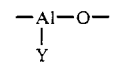

(wherein Y is at least one of organic groups, halogen atoms and hydroxyl group), mixing the polyaluminoxane with at least one silicon-containing compound so as to make the fiber obtainable after calcination of the mixture has a silica content of not more than 70%, spinning the resulting mixture to obtain a precursor fiber, and then calcinating the precursor fiber to obtain the alumina-based fiber. The present invention is described in more detail below.

The aluminoxane used in the present invention is represented by the general formula

(wherein Y is at least one of organic groups, halogen atoms and hydroxyl group). In the present invention, this aluminoxane is produced by mixing an aluminum compound represented by the general formula $AlR_1R_2R_3$ with water in a mole ratio ($[H_2O]/[AlR_1R_2R_3]$) of 1.10 to 1.40.

Specific examples of the aluminum compound represented by the general formula $AlR_1R_2R_3$ are those whose $R_1$, $R_2$ and $R_3$ are each an alkyl group (e.g. methyl, ethyl, propyl, isopropyl, butyl, isobutyl or t-butyl), an alkoxy group (e.g. methoxy, ethoxy, propoxy, isopropoxy, butoxy, isobutoxy, t-butoxy, phenoxy or substituted phenoxy), a carboxyl group (e.g. acetoxy), an acyl group (e.g. acetyl, propionyl or benzoyl) or a halogen group (e.g. chlorine, bromine or iodine).

More practically, such aluminum compounds as trimethylaluminum, triethylaluminum, tripropylaluminum, triisopropylaluminum, tributylaluminum, triisobutylaluminum, dimethylaluminum methoxide, dimethylaluminum ethoxide, dimethylaluminum propoxide, dimethylaluminum isopropoxide, dimethylaluminum butoxide, dimethylaluminum isobutoxide, dimethylaluminum chloride, diethylaluminum methoxide, diethylaluminum ethoxide, diethylaluminum propoxide, diethylaluminum isopropoxide, diethylaluminum butoxide, diethylaluminum isobutoxide, diethylaluminum chloride, trimethoxyl aluminum, triethoxy aluminum, tripropyxyl aluminum, triisopropoxyl aluminum, tributoxy aluminum and triisobutoxy aluminum are employed.

It is well known that the aluminoxane used in the present invention can be obtained by the partial hydrolysis of such aluminum compounds as mentioned above. The thus obtained aluminoxane may be substituted with other appropriate organic groups.

The mole ratio ($[H_2O]/[AlR_1R_2R_3]$) is preferred to be 1.10 to 1.40 in order to obtain a fiber of high strength and high elasticity on an industrial scale.

When the mole ratio is smaller than 1.10, the alumina fiber obtainable after calcination has linear flaws on the fiber sides and, accordingly, has significantly reduced strength.

When the mole ratio exceeds 1.40, precipitate or gel is formed in partial hydrolysis of the aluminum compound making it impossible to obtain a spinning solution of good spinnability.

Temperatures of the spinning atmosphere are preferably kept at above 28° C. in favor of the evaporation of solvent. When the spinning atmosphere is controlled at below 35% relative humidity, the dispersion in strength among single fibers becomes large and the property fluctuates. However, relative humidity of above 80% disturbs the stable operation due to the tendency of dewing.

For the polymerization degree of the polyaluminoxane used in the present invention, at least 2 is sufficient. There is no upper limit for the polymerization degree but polyaluminoxanes having polymerization degree of smaller than 1,000 are ordinarily used because of easiness of the polymerization.

The polyaluminoxane is generally soluble in organic solvents such as ethyl ether, tetrahydrofuran, benzene, toluene, hexane, isopropyl alcohol and the like. When dissolved in such a solvent in an appropriate concentration, it turns to a viscous solution of good spinnability.

The relationship between concentration of the polyaluminoxane in a spinning solution and spinnability of the solution varies depending upon types and polymerization degree of the polyaluminoxane used as well as upon types and amounts of the solvent and the silicon-containing compound to be described later. Although difficult to summarize unitary, the spinning solution is usually controlled so as to adjust its viscosity to 5 to 5,000 poises at spinning temperatures because such a viscosity is generally suitable for spinning.

For the spinning solution, addition of an organic high molecular substance such as polyethylene glycol, polypropylene glycol, polyvinyl formal, polyvinyl acetate or the like or of other appropriate organic substance is desirable for the improved spinnability.

As silicon-containing compounds to be mixed with the polyaluminoxane, there are generally used polyorganosiloxanes having a structural unit represented by

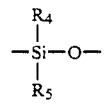

(wherein $R_4$ and $R_5$ are each an organic group), polysilicic acid esters having a structural unit represented by

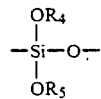

(wherein $R_4$ and $R_5$ each have the same definition as given above), organosilanes represented by $R_nSiX_{4-n}$ (wherein X is OH, halogen, OR or the like, R is an organic group, and n is an integer of 4 or below), silicic acid esters represented by $Si(OR)_4$ (wherein R is an organic group) and other silicon-containing compounds.

Desirably, the silicon-containing compound has a high silica content, however, there may also be used a silicon-containing compound having a low silica content.

The silicon-containing compound may have a low silica content particularly when a silica-alumina fiber of low silica content is produced.

Desirably, the silicon-containing compound forms a uniform solution when mixed with the polyaluminoxane solution, however, the compound may form a dispersion when mixed with the polyaluminoxane solution.

It is further desired that the silicon-containing compound itself be soluble in the polyaluminoxane solution and the resulting solution has spinnability, though this is not requisite. While the maximum amount of the silicon-containing compound to be added partly depends upon spinnability of the compound itself, a silicon-containing compound having no spinnability by itself can be mixed with the polyaluminoxane solution in such a maximum amount that the silica content in the silica-alumina fiber obtainable after calcination is about 70% by weight, preferably about 60% by weight, to secure a resulting mixture still having sufficient spinnability. In some cases, it is effective to mix at least two silicon-containing compounds with the polyaluminoxane solution.

It is desirable to add to the spinning solution at least one compound containing less than 10 mole % in total amount of lithium, beryllium, boron, sodium, magnesium, phosphorus, potassium, calcium, titanium, chromium, manganese, yttrium, zirconium, lanthanum, tungsten or the like, because the alumina-based fiber obtained therefrom has improved properties.

It is preferred to conduct the spinning of mixtures containing the polyaluminoxane and the silicon-containing compound by the dry spinning. However, other suitable spinning methods such as centrifugal spinning and blow spinning may also be used.

Spinning can be conducted at room temperature or by heating the spinning solution. In the latter case, the heating temperature desirably is lower than the boiling point of the solvent used.

The atmosphere surrounding the spun fiber has effects profoundly on evaporation of solvent from the spinning solution as well as on hydrolysis of the polyaluminoxane and the silicon-containing compound. Accordingly, it is very important to control the spinning atmosphere when a fiber of high strength and high elasticity is produced stably on an industrial scale.

Conditions for controlling the spinning atmosphere differ by types of the solvent, the polyaluminoxane and the silicon-containing compound used. It is usually desired that the atmosphere be controlled at temperatures of about 28° C. to about 100° C. and at relative humidity of over 35%.

The precursor fiber produced according to the present invention ordinarily has an average diameter of about 1μ to about 100μ, though the diameter is not restricted to this range.

In the thus obtained alumina-based precursor fiber, alumina-producing materials are formed in uniform and continuous state with a high concentration, and there is no adhesion between fibers. Accordingly, this precursor fiber is very suitable for producing the alumina-based fiber of high strength and high elasticity.

Further, since the alumina-based precursor fiber obtained according to the present invention is a strong fiber by itself, it can optionally be processed into a form such as a fabric or the like and then calcinated to obtain an alumina-based fiber having said form.

The alumina-based precursor fiber according to the present invention can be calcinated as it is or after being subjected to a pretreatment such an exposure to an atmosphere being 40°–95° C. and 50% or higher relative humidity, steam treatment, hot water treatment, acid treatment or their combination. The above treatment gives a precursor containing uniformly reduced organic residue and increased alumina content, which precursor is very suitable for producing stably an alumina-based fiber of high strength and high elasticity.

The alumina-based precursor fiber of the present invention is not heat-meltable and accordingly, by calcinating in an oxygen-containing atmosphere such as air or the like, it can be easily converted to an alumina-based fiber without destroying the original form.

In this way, the precursor fiber, when calcinated in an oxygen-containing atmosphere such as in air, changes into a substantially alumina-based fiber at about 700° C. and turns to a transparent alumina-based fiber of high strength at about 1,200° C.

Of alumina-silica fibers comprising about 30% or more of $Al_2O_3$ and about 70% or less of $SiO_2$, those showing substantially no reflection of alpha-$Al_2O_3$ and cristobalite in the X-ray diffractometry are composed of very small crystalline particles and resultantly have high tensile strength and high elastic modulus.

The alumina-based fiber according to the present invention is substantially free from stable alpha-$Al_2O_3$ crystals and cristobalite crystals. Therefore, this fiber has an appropriate activity and shows excellent adhesion to resins and metals.

Utilizing these excellent properties, the alumina-based fiber according to the present invention can be used in a variety of applications as mentioned below.

Utilizing the high strength and the high elasticity, etc., the alumina-based fiber can be used as reinforcing fibers for synthetic resins such as thermosetting resins, thermoplastic resins and rubbers to obtain composite materials containing synthetic resin substrates.

In this case, the excellent adhesion of the alumina-based fiber is utilized to obtain an alumina-based fiber-reinforced composite material which is excellent in mechanical properties such as tensile strength, bending strength, interlaminar shear strength, impact strength, compression strength and the like.

These alumina-based fiber-reinforced resin matrix composite materials can be used in, for example, structural materials (e.g. aeroplane parts, radar domes, containers for extremely low temperatures, printed circuit boards, automobile parts or bicycle parts) sports and leisure goods (e.g. those used in golf, tennis, fishing, skiing, baseball, gate ball, Japanese fencing or speaker components), and abrasion-grinding materials.

Having high heat resistance and showing stability and appropriate adhesion to metals, the alumina-based fiber of the present invention can also be used for production of an alumina-based fiber-reinforced metal matrix composite material in which metals (e.g. aluminum, nickel, titanium or magnesium) or their alloys are used.

These alumina-based fiber-reinforced metal matrix composite materials can be used in, for example, structural materials (e.g. aeroplane parts, automobile parts, automobile parts, machine parts or heavy electric equipment components) and sports and leisure goods (e.g. those used in golf, tennis, skiing, based ball or speaker components).

Utilizing the flexibility and heat resistance, the alumina-based fiber of the present invention can also be used in applications such as carrier for catalysts for chemical reactions, carrier for catalysts for treatment of automotive exhaust gases, heat-resistant filters for high temperature gases, heat-resistant curtains, heat-resistant ropes, radioactive heat transfer enhancement at high temperatures, bag filters, packings, gaskets and heat insulating materials.

It is not clear why the present invention can provide an alumina-based fiber with excellent mechanical strengths as compared with the conventional processes. However, the reason may be assumed as follows. If an assumption is made that the adhesion between precursor fibers during spinning occurs as a result of the partial dissolution of adjacent precursor fibers by the solvent migrated from the inner portions of these precursor fibers during the solidification stage, production of a precursor fiber using an aluminoxane of high polymerization degree (an aluminoxane of higher polymerization degree can be obtained when the water/aluminum compound mole ratio exceeds 1) incurs less dissolution of precursors by the solvent migrated from the inner portion of the precursor fiber which retains less solvent due to the higher atmospheric temperature. Additionally, non-sticky skin is formed by hydrolysis on the surface of the precursor owing to water present in the spinning atmosphere. These effects reduce the sticking between precursor fibers and the dispersion in strength of the fiber obtained significantly.

As described in detail above, the present invention process employs a very easy means of selecting a particular mole ratio of water to an aluminum compound and spinning under the atmosphere having a specified humidity and temperature in production of a polyaluminoxane which is a raw material for the precursor fiber and thereby enabled the industrial scale production of an alumina-based fiber low in dispersion in strength and superior in mechanical strengths, elastic modulus and heat resistance. Accordingly, it has a very high industrial value.

The present invention is described in more detail below by way of Examples. However, the present invention is in no way restricted by these Examples.

In the Examples, the measurement of fiber strength was conducted in compliance with a method of fiber tensile strength test prescribed in ASTM D3379.

EXAMPLE 1

Thirty kg of monoisopropoxydiethylaluminum was dissolved in 87.4 liters of 1,4-dioxane, and then partially hydrolyzed with 4.50 kg of water ($[H_2O]/[(C_3H_7O)Al(C_2H_5)_2]=1.2$) to obtain a polyisopropoxyaluminoxane.

Thereto was added 2.25 kg of p-cresol and the mixture was stirred under refluxing, whereby 10 mole % of isopropoxy group of the polyisopropoxyaluminoxane was substituted with p-methylphenoxy group.

To the solution was added 9.46 kg of ethyl o-silicate, and then the solvent dioxane was removed by distillation, and the residue was concentrated until the concentrate had a viscosity of 5,000 cp at 60° C.

After deaeration, the concentrate heated to 60° C. was spun by extruding into a spinning chimney of 4 m in length through two spinnerets each having 250 holes of 50μ in diameter.

The spinning atmosphere inside the spinning chimney was controlled by flowing parallel flow air adjusted at a temperature of 50°±2° C. and relative humidity of 75±5%.

The precursor fiber obtained was transparent and very flexible.

The precursor fiber was allowed to stand for 90 minutes in an atmosphere of 70° C. and 85% relative humidity and then calcined in air up to 1,175° C. to obtain a colorless and transparent silica-alumina fiber having a silica content of 20%.

Thirty of those fibers were measured for strengths, in which the average tensile strength was 25 t/cm$^2$, its standard deviation was 2.5 t/cm$^2$, the average elastic modulus was 1,800 t/cm$^2$, and its standard deviation was 160 t/cm$^2$.

The calcinated fiber was ground in a mortar and the resulting powder was subjected to X-ray diffractometry and the BET method. The former showed a crystal form of delta-alumina and the latter showed a specific surface area of 0.3 m$^2$/g.

EXAMPLE 2

Thirty kg of triethylaluminum was dissolved in 70 kg of tetrahydrofuran and then partially hydrolyzed with 5.21 kg of water ($[H_2O]/[C_2H_5)_3Al] = 1.10$) to obtain a polyethylaluminoxane.

Thereto were added 14.21 kg of isopropyl alcohol and 3.15 kg of ethyl salicylate. The mixture was heated to substitute the ethyl group of the polyethylaluminoxane.

To the solution was added 5.92 kg of Ethyl Silicate 40 (a product of Colcoat Co., Ltd.), and the mixture was made into a uniform solution.

Tetrahydrofuran was removed from the solution by distillation and the residue was concentrated until the concentrate had a viscosity of 4,500 cp at 50° C.

After deaeration, the concentrate heated to 45° C. was spun by extruding into a spinning chimney of 5 m in length through 2 spinnerets each having 500 holes of 50μ in diameter.

Air with temperature and humidity modification was fed into the spinning chimney to control the spinning atmosphere at a temperature of 35°±2° C. and a relative humidity of 50±5%.

The transparent precursor fiber obtained was kept for 30 minutes in a constant temperature and constant humidity bath maintained at 80° C. and 95% relative humidity, and then was calcined in air up to 1,200° C. to obtain a colorless and transparent silica-alumina fiber having a silica content of 15%.

That fiber was measured for properties, in which the average tensile strength was 20 t/cm$^2$, its standard deviation was 3.8 t/cm$^2$, the average elastic modulus was 2,000 t/cm$^2$, and its standard deviation was 120 t/cm$^2$. The fiber was made into a powder and subjected to X-ray diffractometry and the BET method. The former showed a crystal form of gamma-alumina and the latter showed a specific surface area of 0.2 m$^2$/g.

EXAMPLE 3

A silica-alumina fiber having a silica content of 15% was obtained in the same manner as in Example 2 except that the amount of the water used for partial hydrolysis was changed to 6.15 kg ($[H_2O]/[(C_2H_5)_3Al] = 1.30$).

The fiber was measured for properties. The average tensile strength was 24 t/cm$^2$, its standard deviation was 3.1 t/cm$^2$, the average elastic modulus was 2,000 t/cm$^2$, and its standard deviation was 105 t/cm$^2$. The crystal form according to powder X-ray diffractometry was gamma-alumina and the specific surface area by the BET method was 0.2 m$^2$/g.

EXAMPLE 4

A silica-alumina fiber having a silica content of 15% was obtained in the same manner as in Example 2 except that the amount of the water used for hydrolysis was changed to 6.63 kg ($[H_2O]/[(C_2H_5)_3Al] = 1.4$).

The fiber was measured for properties. The average tensile strength was 21 t/cm$^2$, its standard deviation was 3.6 t/cm$^2$, the average elastic modulus was 2,000 t/cm$^2$, and its standard deviation was 125 t/cm$^2$. The crystal form according to powder X-ray diffractometry was gamma-alumina and the specific surface area by the BET method was 0.2 m$^2$/g.

EXAMPLE 5

Thirty kg of diethylaluminum chloride was dissolved in 80 kg of toluene and then partially hydrolyzed with 5.15 kg of water ($[H_2O]/[(C_2H_5)_2AlCl] = 1.15$). Thereto was added 7.05 kg of stearic acid and the mixture was heated to obtain a polyaluminoxane having stearic acid group as the side chains.

To the solution was added 0.21 kg of a silicone oil having a viscosity of 100 cs, and toluene was removed by distillation. The residue was concentrated until the concentrate had a viscosity of 8,000 cp at 60° C.

After deaeration, the concentrate heated to 65° C. was spun by extruding into a spinning chimney of 4 m in length through 2 spinnerets each having 250 holes of 50μ in diameter.

The atmosphere inside the spinning chimney was controlled at a temperature of 60°±2° C. and a relative humidity of 50±5%.

The precursor fiber obtained was calcined in air up to 1,250° C. to obtain a colorless and transparent silica-alumina fiber having a silica content of 5%.

The fiber was measured for properties. The average tensile strength was 20 t/cm$^2$, its standard deviation was 2.3 t/cm$^2$, the average elastic modulus was 2,600 t/cm$^2$, and its standard deviation was 170 t/cm$^2$. The crystal form according to powder X-ray diffractometry was delta-alumina and the specific surface area by the BET method was 0.5 m$^2$/g.

EXAMPLE 6

Thirty kg of ethylisopropoxyphenoxyaluminum was dissolved in 100 kg of diethylether and then partially hydrolyzed with 2.73 kg of water. Thereto were added 6.90 kg of Ethyl Silicate 40 (a product of Colcoat Co., Ltd.) and 0.38 kg of a silicone oil of 100 cst.

The solvent was removed by distillation and the residue was concentrated until the concentrate had a viscosity of 15,000 cp 25° C. The concentrate was used as a spinning solution.

The spinning solution heated to 30° C. was spun by extruding into a spinning chimney of 4 m in length through 2 spinnerets each having 500 holes of 50μ in diameter.

The atmosphere inside the spinning chimney was controlled at a temperature of 28±2° C. and a relative humidity of 80±5%.

The precursor fiber obtained was calcinated up to 1,175° C. to obtain a silica-alumina fiber having a silica content of 30%.

The fiber was measured for properties. The average tensile strength was 18 t/cm$^2$, its standard deviation was 3.0 t/cm$^2$, the average elastic modulus was 1,800 t/cm$^2$, and its standard deviation was 150 t/cm$^2$. The crystal form according to powder X-ray diffractometry was delta-alumina and the specific surface area by the BET method was 0.6 m$^2$/g.

COMPARATIVE EXAMPLE 1

Thirty kg of monoisopropoxydiethylaluminum was dissolved in 87.4 liters of 1,4-dioxane and then partially hydrolyzed with 3.75 Kg of water ($[H_2O]/[C_3H_7OAl(C_2H_5)_2] = 1.0$). The subsequent procedure was same as in Example 1, whereby was obtained a silica-alumina fiber having a silica content of 20%.

The fiber was measured for properties. The average tensile strength was 12.5 t/cm$^2$, its standard deviation was 3.2 t/cm$^2$, the average elastic modulus was 1,800 t/cm$^2$, and its standard deviation was 200 t/cm$^2$. The crystal form according to powder X-ray diffractometry was delta-alumina and the specific surface area by the BET method was 0.3 m$^2$/g.

COMPARATIVE EXAMPLE 2

A spinning solution was produced in the same manner as in Example 2 except that the amount of the water used for hydrolysis was changed to 7.11 Kg ($[H_2O]/[(C_2H_5)_3Al] = 1.50$). The solution was cloudy.

It was tried to spin that spinning solution, however, the plugging of the nozzles and fiber breakage were striking and it was impossible to obtain a satisfactory precursor fiber.

COMPARATIVE EXAMPLE 3

An alumina based fiber was prepared in the same manner as in Example 2 except that the atmosphere inside of the spinning chimney was controlled at a relative humidity of 20±5%.

The fiber was measured for properties. The average tensile strength was 13.7 t/cm$^2$, its standard deviation was 3.6 t/cm$^2$, the average elastic modulus was 1,820 t/cm$^2$, and its standard deviation was 210 t/cm$^2$.

COMPARATIVE EXAMPLE 4

An alumina based fiber was prepared in the same manner as in Example 4 except that the atmosphere inside of the spinning chimney was controlled at a relative humidity of 20±5%.

The fiber was measured for properties. The average tensile strength was 11.7 t/cm$^2$, its standard deviation was 2.2 t/cm$^2$, the average elastic modulus was 1,900 t/cm$^2$, and its standard deviation was 120 t/cm$^2$.

COMPARATIVE EXAMPLE 5

An alumina based fiber was prepared in the same manner as in Example 3 except that the atmosphere inside of the spinning chimney was controlled at a temperature of 22°±2° C. and relative humidity of 25±5%.

The fiber was measured for properties. The average tensile strength was 11.2 t/cm$^2$, its standard deviation was 2.3 t/cm$^2$, the average elastic modulus was 1,890 t/cm$^2$, and its standard deviation was 108 t/cm$^2$.

COMPARATIVE EXAMPLE 6

A spinning concentrate prepared in the same manner as in Example 2 was spun under an atmosphere controlled at a temperature of 22°±2° C. and relative humidity of 75%.

The fiber was measured for properties. The average tensile strength was 14.0 t/cm$^2$, its standard deviation was 2.0 t/cm$^2$, the average elastic modulus was 1,750 t/cm$^2$, and its standard deviation was 180 t/cm$^2$.

We claim:

1. A process for producing an alumina-based fiber, which comprises mixing an aluminum compound represented by the general formula $AlR_1R_2R_3$ (wherein $R_1$, $R_2$ and $R_3$ are each an organic group or a halogen) with water in a molar ratio of ($[H_2O]/[AlR_1R_2R_3]$) of 1.10 to 1.40 to produce a polyaluminoxane having a structural unit represented by the general formula:

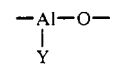

(wherein Y is at least one member selected from the group consisting of organic groups, halogens and hydroxyl groups), mixing the polyaluminoxane with at least one silcon-containing compound in an amount such that the desired alumina-based fiber has, after calcining, a silica content of up to 70%, spinning the resulting mixture of polyaluminoxane and silicon-containing compound under an atmosphere controlled at a temperature of about 28° C. and a relative humidity of above 35% to obtain a precursor fiber, and then calcinating the precursor fiber to obtain an alumina-based fiber.

* * * * *